US007849901B2

(12) United States Patent
Lahmann et al.

(10) Patent No.: US 7,849,901 B2
(45) Date of Patent: Dec. 14, 2010

(54) AUTOCLAVE FOR CURING RETREADED TIRES

(75) Inventors: Jan Lahmann, Piedmont, SC (US); Theophile Henry Louchart, III, Roebuck, SC (US)

(73) Assignee: Michelin Recherche et Technique, Granges-Paccot (CH)

( * ) Notice: Subject to any disclaimer, the term of this patent is extended or adjusted under 35 U.S.C. 154(b) by 1023 days.

(21) Appl. No.: 11/634,631

(22) Filed: Dec. 6, 2006

(65) Prior Publication Data

US 2007/0079937 A1    Apr. 12, 2007

Related U.S. Application Data

(60) Division of application No. 10/696,712, filed on Oct. 29, 2003, now Pat. No. 7,150,303, which is a continuation of application No. PCT/US01/14576, filed on May 4, 2001.

(51) Int. Cl.
*B29C 35/02* (2006.01)
(52) U.S. Cl. .................... 156/382; 156/394.1; 156/909; 425/18; 432/205
(58) Field of Classification Search ............... 156/96, 156/394.1, 909, 382; 425/18, 34.3; 422/295, 422/297; 432/194, 203, 205
See application file for complete search history.

(56) References Cited

U.S. PATENT DOCUMENTS

| | | | |
|---|---|---|---|
| 1,420,371 A | 6/1922 | Emmons | |
| 2,317,890 A | 4/1943 | Dawson | |
| 2,357,960 A | 9/1944 | Kuster et al. | |
| 2,364,167 A | 12/1944 | Scott | |
| 3,605,717 A | 9/1971 | Sauer | |
| 3,624,806 A | 11/1971 | Lytzen | |
| 4,075,047 A | 2/1978 | Brodie et al. | |
| 4,490,110 A | 12/1984 | Jones | |
| 4,541,979 A | 9/1985 | Cooke et al. | |
| 4,854,863 A * | 8/1989 | Hemsath | ..................... 432/205 |
| 4,974,663 A | 12/1990 | Nakaji | |

OTHER PUBLICATIONS

International Search Report PCT/US01/14576 dated Jan. 18, 2002.

\* cited by examiner

*Primary Examiner*—Geoffrey L Knable
(74) *Attorney, Agent, or Firm*—Frank J. Campigotto

(57) ABSTRACT

An improved autoclave for curing retread tires includes a chamber with circulating air flow having turbulence generating devices located in a middle length-wise portion of the chamber. The turbulence generating devices include apertures to guide air from a supply duct into the chamber, and/or wedge-shaped elements or fins mounted on the interior wall of the chamber to disrupt the air flow and cause turbulence.

9 Claims, 4 Drawing Sheets

AUTOCLAVE FOR CURING RETREADED TIRES

This application is a divisional of U.S. patent application Ser. No. 10/696,712, filed Oct. 29, 2003, now U.S. Pat. No. 7,150,303 which was a continuation of PCT Application No. PCT/US2001/14576, filed May 4, 2001.

BACKGROUND AND SUMMARY OF THE INVENTION

1. Field of the Invention

The invention relates to autoclaves for curing retreaded tires, that is, heat and pressure chambers for vulcanizing a material bonding a new tread to a used tire casing. More particularly, the invention is directed to an improvement in the heat transfer characteristics of an autoclave operating with forced-air flow.

2. Description of the Related Art

A type of autoclave in current use in the retread industry includes a chamber having an elongated, cylindrical shape capable of containing a group of tires for a curing process. The tires are encased in flexible covers or envelopes, which are evacuated to remove air from between and around the new tread and tire casing. The tires in the envelopes are suspended in the chamber to allow heated air to flow to the outer circumference of the tire and tread. The air in the autoclave is pressurized to force the new tread against the tire casing to achieve a uniform, tight bond. The air is heated to a temperature sufficient to produce the vulcanization reaction of the gum rubber layer interposed between the tread and casing.

A problem in the art exists in chambers that circulate air between the chamber and the heat source. The air returned to the chamber is heated to a sufficient temperature to vulcanize the entire group of tires in the chamber throughout the length of the chamber. Nonetheless, a "cold spot" can occur where the vulcanization reaction is less effective, between where the heated air enters the chamber from the supply duct and where the air is taken into the heat source. Often, the cold spot is at approximately the midpoint of the chamber.

SUMMARY OF THE INVENTION

One attempt to resolve this problem involved mounting a cone at the lead tire to deflect heated air entering the chamber from the supply duct to flow around the outer circumferences of the tires, but the result has not been satisfactory.

According to the invention, heat transfer to the tires in a forced air flow autoclave is improved by increasing the air turbulence in the chamber, in particular, in the middle portion of the chamber. The inventors have theorized that the air flow through the chamber varies from a state of high turbulence where the air exits the return duct, to a smoother flow in the middle portion, followed by a more turbulent flow as the air is drawn from the chamber to the heat source. The smoother flow in the center portion is believed to be responsible for the less efficient heat transfer in this section of the chamber. The invention is accordingly directed to devices for disturbing the air flow in the chamber to increase turbulence.

A solution for generating turbulence in the air flow, according to the invention, is to direct or duct a portion of air from the supply duct into the chamber at approximately the center of the flow path in the chamber, which in a longitudinal chamber is approximately the longitudinal midpoint. The ducted air is directed to flow counter or cross to the flow of air in the chamber, and accordingly, generates turbulence in the chamber air flow. A simple ducting device is an aperture in the supply duct wall with a louver or flap extending into the supply duct to guide air from the supply duct into the chamber. The increased turbulence in the air flowing through the chamber is believed to improve the heat transfer characteristics. In addition, the ducted air is hotter than the main air flow at the center, and accordingly, the longitudinal temperature profile is made more uniform.

According to one embodiment of the invention, two apertures and louvers are provided on the supply duct walls in opposed relationship. Preferably, the apertures and louvers are located at a common plane at about the longitudinal midpoint of the chamber. However, other locations in the middle portion of the chamber could be selected depending on the flow characteristics of a particular chamber or location of the cold spot in a particular chamber. Additional ducts could be placed in longitudinally spaced relation in longer chambers to maintain a high level of turbulence.

Other devices for ducting air from the supply duct into the chamber are contemplated by the invention. For example, a nozzle or tube mounted to the supply duct wall and communicating with the supply duct could effectively direct air into the chamber air flow to cause increased turbulence.

Another embodiment of the invention includes placing turbulence generating devices on the interior wall of the middle portion of the chamber. Such devices could include wedges, fins, vanes, or other elements to generate turbulence by disrupting the air flow pattern and/or directing air toward the center of the chamber.

According to a preferred embodiment, the air-disturbing devices (apertures and/or turbulence generating devices) are located in the middle third of the chamber, and more preferably, at the center of the chamber. By "middle portion" is meant the portion of the chamber in which a cold spot occurs, which can be determined directly by measurement of the temperature of the tires. Generally, this is the middle third of the chamber; however, the exact location and extent of the middle portion may depend factors influencing the air flow characteristics, including the total length of the chamber, the space between and around the tires, the tire tread design, and the air flow velocity in the chamber. In longer chambers, the cold spot could occur somewhere in or take up the middle 50% of the chamber length, that is, beginning about 25% of the length from the air inlet.

BRIEF DESCRIPTION OF THE DRAWINGS

The invention will be better understood by reference to the following detailed description in conjunction with the appended drawings, in which.

DETAILED DESCRIPTION OF PREFERRED EMBODIMENTS

Figure 1:
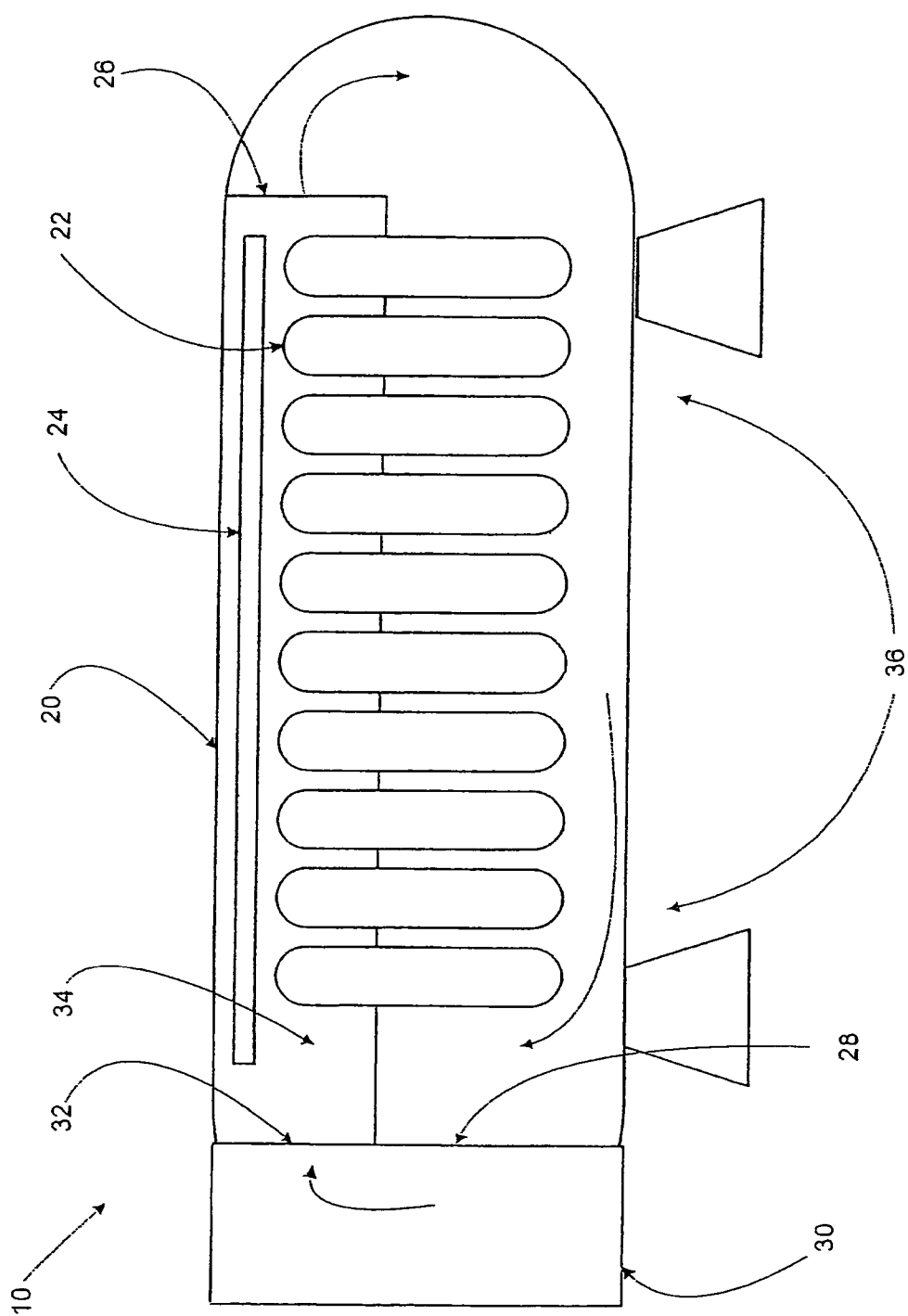
FIG. 1 is a schematic view of an autoclave in longitudinal section in accordance with an embodiment of the invention.

FIG. 1 is a simplified, schematic illustration of an autoclave 10 for curing retreaded tires currently in common use in the industry. The autoclave 10 includes an elongated chamber 20 providing a space for containing a plurality of tires 22 for a cure process. The tires 22 are suspended from a rack or frame 24 so that heated air may circulate freely about the tires. Typically the tires 22 are placed in envelopes or covers that are connected to a vacuum source (not shown) to evacuate the interior of the envelope, especially the region of the new tread and tire crown, to eliminate air at the bonding site and to generate a pressure differential between the chamber and the tread.

An autoclave of the type shown is used in the type of retread process in which a cured tread and an uncured gum rubber layer are placed on a prepared tire casing and the assembly is then heated under pressure to vulcanize the gum rubber, bonding the tread to the casing.

In the type of autoclave illustrated in FIG. 1, air is heated by a heat source 30, which can be, for example, a steam, water or oil to air heat exchanger. The heated air exits the heat source 30 at the outlet 32 and passes through an supply duct 34 to a duct exit 26. The supply duct 34 of the type illustrated includes a sheet fastened to the inner wall of the chamber 20 to define a narrow passage. In the type of autoclave 10 illustrated, two supply ducts 34 are provided in the chamber 20 on opposite sides of the frame 24. Heated air moving from the duct exit 26 reverses direction at the head of the chamber and circulates through the chamber 20 to an inlet 28 of the heat source 30. A fan or other suitable air moving device (not illustrated) moves the air through its circulation path. The invention is not limited to this particular type of air heating and ducting structure, and other suitable structures could be substituted. For example, in another type of autoclave, electric resistance heaters are mounted in an supply duct similar to that illustrated, and a fan forces air through the duct for heating and to return to the front of the chamber.

As mentioned above, a problem in a circulating air autoclave is that a cold spot, or less efficient heat transfer area, can develop somewhere in the longitudinally middle portion 36 of the chamber 20. The tire assemblies in this middle portion do not cure as quickly as the tires at the ends of the chamber 20.

The inventors have discovered that increasing the air turbulence in the chamber made the rate of cure of the tires more uniform throughout the chamber. The inventors believe that air flow in the middle portion 36 of the chamber 20 is less turbulent and more laminar than the air flow near the supply duct exit 26 and near the heat source inlet 28. The movement of air from the supply duct exit 26 and to the heat source inlet 28 produces turbulence in the flow. The inventors realized that increasing the turbulence in the middle portion 36 would improve the heat transfer to the tire assemblies in the middle portion.

As used herein, the middle portion 36 is meant to define a region of the chamber encompassing the cold spot. This is believed to be approximately the middle third of the air flow path for the typical autoclave, but the exact location can depend on other factors. The cold spot in relatively shorter chambers could have a shorter extent and the cold spot in longer chambers could accordingly be somewhat longer. In addition, such things as air flow velocity, the space between or around the tire assemblies, and the tread design could alter the location and extent of the cold spot. Those skilled in the art will recognize that the exact location and bounds of the cold spot can be determined by measuring the temperature in the tire assemblies arrayed along the length of the chamber.

Figure 2:
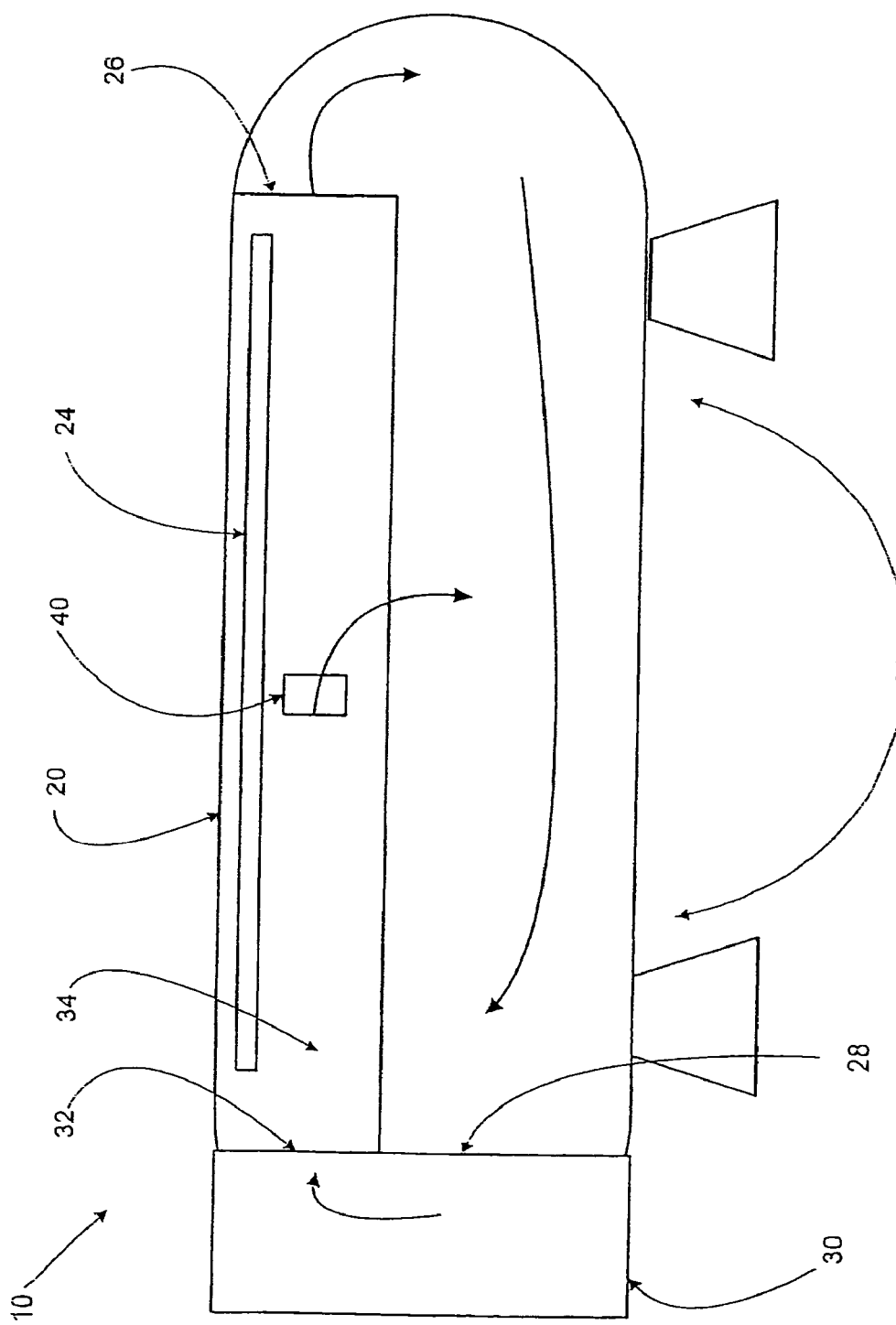
FIG. 2 is a schematic view of the chamber of FIG. 1 in which the tires have been removed and including a turbulence generating aperture in accordance with the invention.

FIG. 2 illustrates an autoclave having a turbulence generating device in accordance with the invention. The tires shown in FIG. 1 have been removed for clarity. An aperture 40 is formed in the wall of the supply duct 34 at approximately the midpoint of the air flow path, which in the chamber shown corresponds to the longitudinal midpoint of the chamber. The aperture 40 is formed with a flap, fin or louver (not visible in this view) to guide air from the return duct 34 into the chamber 20. This ducted air, moving from left to right in the figure, enters the chamber 20 in counterflow and/or crossflow to the main air flow in the chamber, which moves from right to left in the figure. The ducted air disturbs the flow in the chamber, and causes or increases the turbulence in the flow, thus leading to an improvement in heat transfer. Another advantage is that the air entering through the aperture 40 is hotter than the main air flow at that point, which lost some heat to the tires. Thus, the ducted air adds heat energy to the main air flow at the chamber 20 center area making the temperature profile more uniform.

Figure 3:
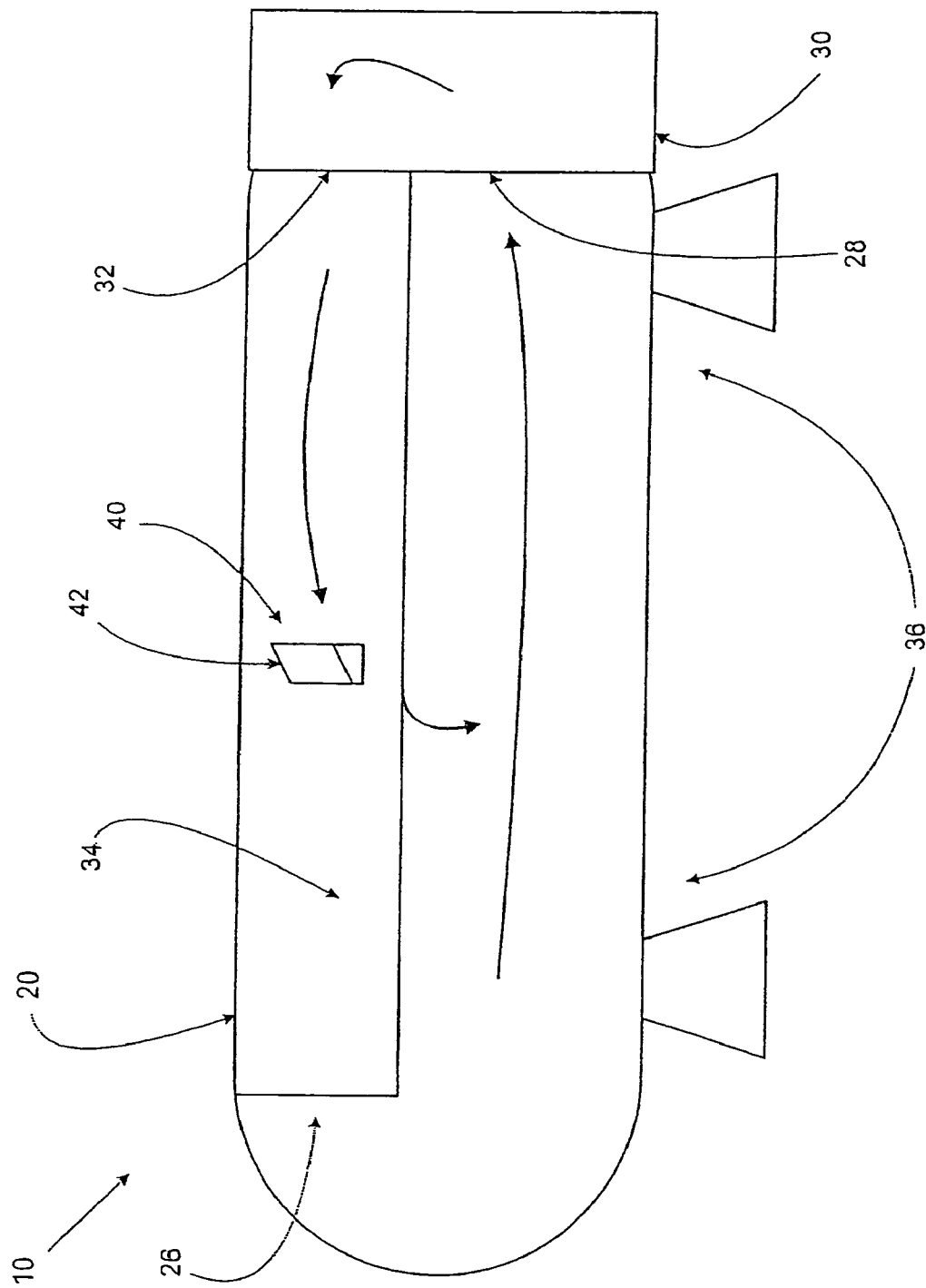
FIG. 3 is a schematic view of the chamber of FIG. 2 viewed from an opposite direction so that an interior of the supply duct is shown.

FIG. 3 illustrates the autoclave 10 of FIG. 2 from the opposite direction, so that the interior of the supply duct 34 is shown. The aperture 40 and louver 42 are on the supply duct 34 wall and the louver 42 extends into the supply duct to help guide air (indicated by the arrow) into the chamber.

According to the invention, one or more apertures 40 and louvers 42 can be formed in the wall of the supply duct 34 at locations where increased turbulence would be helpful. The inventors have found that two apertures 40 and louvers 42 formed at approximately the longitudinal midpoint and spaced circumferentially about the chamber to be effective in making curing more uniform in a chamber sized for twenty-five tires.

Figure 4:
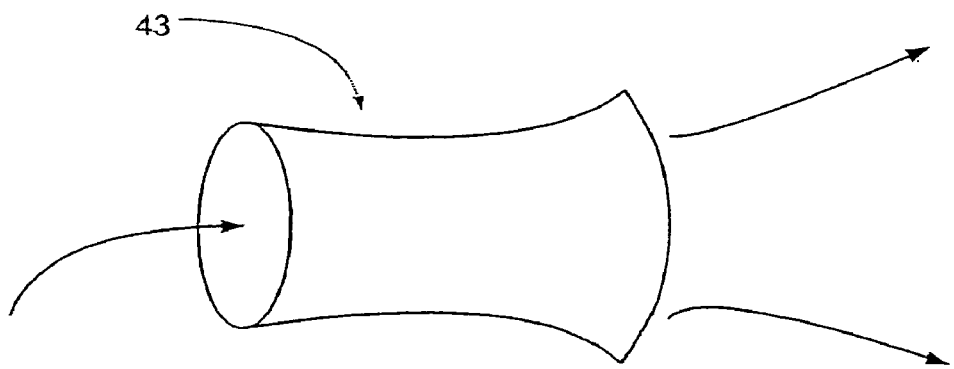
FIG. 4 is a view of a turbulence generating device in the form of a nozzle.

Other devices for generating turbulence by ducting air from the supply duct 34 to the interior of the chamber 20 could be used. For example, a tube or a nozzle structure 43, illustrated in FIG. 4, could be mounted on the supply duct 34 to guide air into the chamber 20. A tube or nozzle 43 could be used to better direct the ducted air to the tire assemblies, and an array of tubes or nozzles could provide disturbing flows in different directions in the chamber air flow. A hood or scoop might be used to guide air into the nozzle or tube from the duct.

As would be recognized by those skilled in the art, the apertures or nozzles could be used with any type of supply duct. The aperture/louvers and nozzles are not mutually exclusive; a chamber could be equipped with both apertures and nozzles.

According to another embodiment of the invention, turbulence-generating devices are mounted on the interior of the chamber wall to disturb the main air flow. The turbulence generating devices are positioned where the air flow begins to lose turbulence downstream of the supply duct exit 26. Typically, this would be about one-fourth to one-third of the air flow path, corresponding to one-fourth to one-third of the length of the illustrated chamber 20 measured from the supply duct exit 26.

Figure 5:
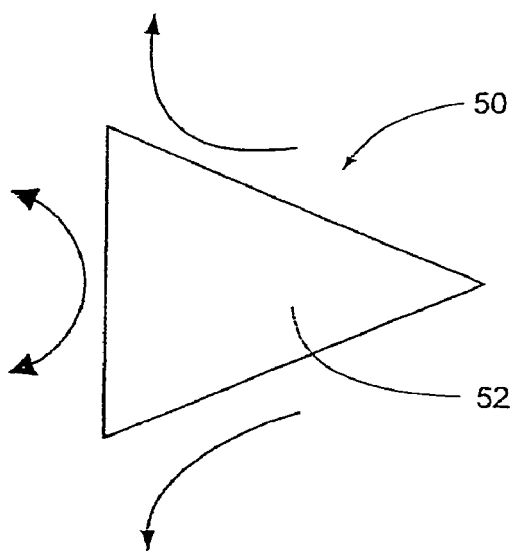
FIG. 5 is a plan view of a turbulence generating device in the form of a wedge.
Figure 6:
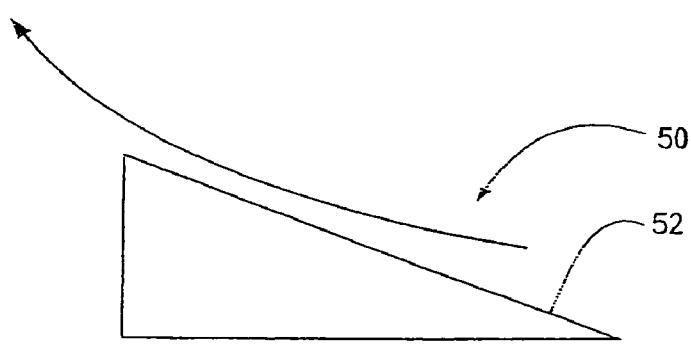
FIG. 6 is a side view of the wedge shown in FIG. 4.

FIGS. 5 and 6 illustrate an example of a suitable turbulence generating device. FIG. 5 shows a wedge-shaped element 50 in plan view positioned to divide the air flow and generate a swirling region at its downstream end. FIG. 6 shows the wedge-shaped element in side view, the upper surface 52 acting as a ramp to guide air flow away from the chamber wall and across the air flow above the wedge 50. A plurality of these wedge-shaped elements positioned circumferentially around the interior chamber wall could be used to disrupt the air flow and cause turbulence.

Other air-disturbing elements could be substituted, including simple flaps, fins, or vanes, as will be understood by those skilled in the art.

The invention has been described in terms of preferred principles and embodiments, however, substitutions and equivalents could be employed without departing from the scope of the invention as defined by the following claims.

What is claimed is:

1. An autoclave for curing a tread strip to a tire casing with heated, pressurized air, comprising:
   an elongated chamber bounded by all interior surface and having a frame for supporting tire casing and tread assemblies within the chamber, wherein the chamber length is greater than the chamber width;
   a heat source for heating air;
   a supply duct defined by a wall, the supply duct having an inlet and an outlet located at opposite ends of the chamber length, the supply duct adapted to carry a main flow of circulating air longitudinally from the inlet of the supply duct to the outlet of the supply duct located at the opposite end of the chamber length;
   an air circulating system for circulating air as a flow through the length of the chamber, past the heat source, and through the supply duct; and
   a set of air flow turbulence generators comprising one or more air deflectors selected from a fin, a wedge-shaped element, a vane or a flap mounted on the interior surface of a longitudinal middle portion of the chamber relative to the chamber length and disposed between one-fourth and three-fourths of the longitudinal air flow path through the chamber as measured from the outlet of the supply duct to the inlet of the supply duct, to direct a portion of air that is flowing both substantially parallel and adjacent to the interior surface away from the interior surface in a direction disruptive to the main air flow in the chamber.

2. The autoclave of claim 1, wherein the heat source is a heat exchanger.

3. The autoclave of claim 1, wherein at least one of the one or more air deflectors is disposed between one-fourth and one-third of the longitudinal air flow path through the chamber as measured from the supply duct exit.

4. The autoclave of claim 1, further comprising:
   a second set of air flow turbulence generators, wherein the second set comprise one or more apertures formed on the wall of the supply duct to guide air from the duct into the chamber in a direction disruptive to the main air flow in the chamber.

5. The autoclave of claim 4, wherein at least one of the one or more apertures is formed at a midpoint of the main air flow through the chamber.

6. The autoclave of claim 4, wherein at least one of the one or more apertures includes a louver formed on the wall of the duct to guide air from the supply duct.

7. The autoclave of claim 4, wherein the apertures comprise at least one nozzle communicating with the supply duct to guide air into the chamber for disruption of the main air flow in a central third of the chamber.

8. The autoclave of claim 4, wherein the at least one aperture is disposed in a middle third portion of the air flow path through the chamber.

9. The autoclave of claim 1, wherein at least one of the one or more air deflectors is disposed between one-third and two-thirds of the longitudinal air flow path through the chamber as measured from the supply duct exit.

* * * * *